US008114305B2

(12) United States Patent
Komiyama et al.
(10) Patent No.: US 8,114,305 B2
(45) Date of Patent: Feb. 14, 2012

(54) METHOD OF MANUFACTURING SUBSTRATE FOR LIQUID DISCHARGE HEAD

(75) Inventors: Hiroto Komiyama, Tokyo (JP); Hirokazu Komuro, Yokohama (JP); Satoshi Ibe, Yokohama (JP); Takuya Hatsui, Tokyo (JP); Keisuke Kishimoto, Yokohama (JP); Kazuhiro Asai, Kawasaki (JP); Shimpei Otaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 789 days.

(21) Appl. No.: 12/203,651

(22) Filed: Sep. 3, 2008

(65) Prior Publication Data

US 2009/0065482 A1 Mar. 12, 2009

(30) Foreign Application Priority Data

Sep. 6, 2007 (JP) ................................ 2007-231336

(51) Int. Cl.
*G01D 15/00* (2006.01)
*G11B 5/127* (2006.01)

(52) U.S. Cl. .............................. 216/27; 216/87; 216/94

(58) Field of Classification Search ........................ None
See application file for complete search history.

(56) References Cited

U.S. PATENT DOCUMENTS

| | | | | |
|---|---|---|---|---|
| 6,143,190 | A | 11/2000 | Yagi et al. | |
| 6,648,454 | B1 | 11/2003 | Donaldson et al. | |
| 7,207,109 | B2 * | 4/2007 | Tokunaga et al. | 29/890.1 |
| 7,250,113 | B2 | 7/2007 | Komuro et al. | |
| 2006/0026834 | A1 * | 2/2006 | Nishida | 29/890.1 |
| 2007/0019043 | A1 * | 1/2007 | Oya | 347/70 |
| 2007/0212891 | A1 * | 9/2007 | Yamamuro et al. | 438/733 |
| 2008/0076197 | A1 | 3/2008 | Komuro et al. | |
| 2008/0094454 | A1 | 4/2008 | Koyama et al. | |
| 2009/0065472 | A1 | 3/2009 | Asai et al. | |
| 2009/0065473 | A1 | 3/2009 | Ibe et al. | |
| 2009/0065476 | A1 | 3/2009 | Komiyama et al. | |
| 2009/0065481 | A1 | 3/2009 | Kishimoto et al. | |

* cited by examiner

*Primary Examiner* — Duy Deo
(74) *Attorney, Agent, or Firm* — Fitzpatrick, Cella, Harper & Scinto

(57) ABSTRACT

A method of manufacturing a silicon substrate for a liquid discharge head with a liquid supply opening formed therein includes: forming one processed portion by laser processing on the substrate from one surface of the substrate; expanding the one processed portion to form a recess portion by performing laser processing at a position which overlaps a part of the one processed portion and does not overlap another part of the one processed portion; and etching from the one surface the substrate with the recess portion formed therein to form the liquid supply opening.

7 Claims, 4 Drawing Sheets

METHOD OF MANUFACTURING SUBSTRATE FOR LIQUID DISCHARGE HEAD

BACKGROUND OF THE INVENTION

1. Field of the Invention

The present invention relates to a method of manufacturing a substrate for a liquid discharge head used for a liquid discharge head.

2. Description of the Related Art

As a liquid discharge head for discharging liquid, an ink jet head for discharging ink as the liquid is known. In a typical ink jet head, a through opening (ink supply opening) is provided in a substrate having ink discharge pressure generating elements formed thereon, and the ink is supplied from a surface opposite to a surface having the ink discharge pressure generating elements formed thereon.

As a method of forming an ink supply opening of this type, U.S. Pat. No. 6,143,190 proposes a method in which a silicon substrate with a patterned mask material is anisotropically etched in a strong alkaline solution. The gist of this method is to form an ink supply opening, the inner walls of which are all (111) surfaces, in a silicon substrate by making (111) surfaces having a low etching rate emerge utilizing anisotropic etching of silicon. When anisotropic etching is performed on a silicon (001) substrate, (111) surfaces are formed at an angle of 54.7 degrees inward from an end of an opening in the mask, and hence the opening width of the through opening can be defined by the width of the mask formed on a back surface of the silicon substrate.

However, in order to form the through opening, this method requires a large opening width in the mask on the back surface. The opening width of the mask on the back surface is defined by the thickness of a wafer and the opening width on a front surface of the wafer. For example, when the thickness of the silicon substrate is 625 μm and the opening width on the front surface is 120 μm, the opening width in the mask on the back surface has to be 1000 μm. Thus, in a method of forming an ink supply opening of this kind, the size of the chip substrate is defined by the size of the ink supply opening, and hence miniaturization of the chip substrate is limited.

On the other hand, U.S. Pat. No. 6,648,454 discloses a manufacturing method which achieves miniaturization by suppressing formation of a (111) surface through combination of deep digging of silicon and anisotropic etching.

This manufacturing method includes the steps of deeply digging silicon to form a blind trench (blind hole) in a portion where an ink supply opening is to be formed, and thereafter, performing anisotropic etching. By forming the trench, time necessary for the anisotropic etching to form a through opening is shortened, and a miniaturized chip in which the width of the ink supply opening is small is manufactured.

As disclosed in U.S. Pat. No. 6,648,454, by forming a trench to decrease the amount of Si etched by the anisotropic etching, the width of the ink supply opening in a transverse direction can be made small, and hence a miniaturized chip can be manufactured. In a simplified manner, an opening width X of the ink supply opening is determined by a width L of the trench and an amount E of the etched Si, and the relational expression can be calculated as $X=L+2E$.

In this case, as the formed trench is deeper, the amount of the etched Si becomes smaller for forming the through opening, and hence the miniaturization can be further enhanced. For example, when a trench is formed at a width of 200 μm and at a depth of 500 μm in an Si wafer at a thickness of 625 μm, the width X of the ink supply opening is calculated to be 450 μm. Meanwhile, when the depth is 550 μm, X can be as small as 350 μm.

However, with regard to a substrate for an ink jet head in which, after wiring and nozzles are formed on a surface of the substrate, the blind trench is formed and anisotropic etching is performed from a back surface of the substrate to form the through opening, the following problem arises. Specifically, taking into consideration damage of the substrate and stability of the depth of the processing, it is difficult to deeply dig Si with accuracy, and a miniaturized ink supply opening cannot be manufactured.

In U.S. Pat. No. 6,648,454, sandblasting, dicing, dry etching, and laser processing are listed as exemplary methods of processing Si, but those methods cannot be adapted for deeply digging Si in manufacturing the above-mentioned substrate for an ink jet head for the following reasons.

First, machining such as sandblasting or dicing generates various sizes of cracks, which causes more chipping and cracks of the substrate. Second, dry etching has a low etching rate, and hence is less productive and is not a realistic method.

With regard to laser processing, Si removed in the processing (hereinafter, referred to as debris) accumulates at the bottom of and on an end face of the processed hole to cause scattering of an entering laser, which makes it difficult to deeply dig Si. If the laser spot diameter is increased to make the processed area larger, the debris is more easily let out from the processed hole. However, in this case, the increased spot diameter decreases irradiated energy per unit area, and hence the processing ability is lowered. Further, a high-power laser can deeply dig Si. However, since the processing energy is too high, it becomes considerably difficult to control the depth of the processed hole. Further, in deeply digging Si, the hole may pierce the Si substrate. In that case, a further problem arises that wiring and nozzles already formed on the surface of the substrate are damaged to spoil the function as an ink jet head.

SUMMARY OF THE INVENTION

Accordingly, the present invention is made to solve the problems of the above-mentioned related arts. An object of the present invention is to provide a method of forming with accuracy and stability an ink supply opening which can achieve miniaturization of a substrate for an ink jet head.

An exemplary embodiment of the present invention is a method of manufacturing a substrate for a liquid discharge head, the substrate including a silicon substrate with a liquid supply opening formed therein, the method including: forming one processed portion by laser processing on the substrate from one surface of the substrate, expanding the one processed portion to form a recess portion by performing laser processing at a position which overlaps a part of the one processed portion and does not overlap another part of the one processed portion, and etching from the one surface the substrate with the recess portion formed therein to form the liquid supply opening.

Another exemplary embodiment of the present invention is a method of manufacturing a substrate for a liquid discharge head, the substrate including a silicon substrate with a liquid supply opening formed therein, the method comprising: forming a plurality of the recess portions each having a spiral pattern so that the plurality of the recess portions are discontinuous with one another, etching from the one surface the substrate with the recess portion formed therein to form the liquid supply opening.

According to the present invention, in forming a through opening to be an ink supply opening in a substrate for an ink jet head by forming a recess portion and performing anisotropic etching from a back surface of the substrate, an ink supply opening which can achieve miniaturization of a substrate for an ink jet head can be formed with accuracy and stability.

Further features of the present invention will become apparent from the following description of exemplary embodiments with reference to the attached drawings.

DESCRIPTION OF THE EMBODIMENTS

Figure 1A:
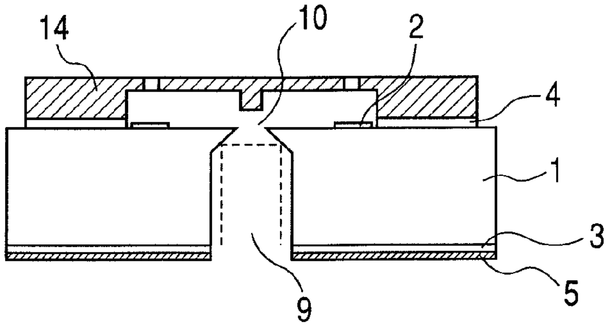
FIGS. 1A and 1B are diagrams for illustrating a first embodiment of a substrate for an ink jet head according to the present invention.

Hereinafter, embodiments of the present invention are described with reference to the attached drawings. It is to be noted that, in the following description, throughout the drawings, like reference numerals are used to designate components having like functions and description thereof may be omitted. Further, it is to be noted that, in the following description, a substrate for an ink jet head which can be used for an ink jet head is described as an example of a substrate for a liquid discharge head which is used for a liquid discharge head. However, the present invention is not limited thereto, and the substrate for a liquid discharge head may also be a liquid discharge head for manufacturing a DNA chip, for manufacturing a display, or the like.

First Embodiment

Figure 1B:
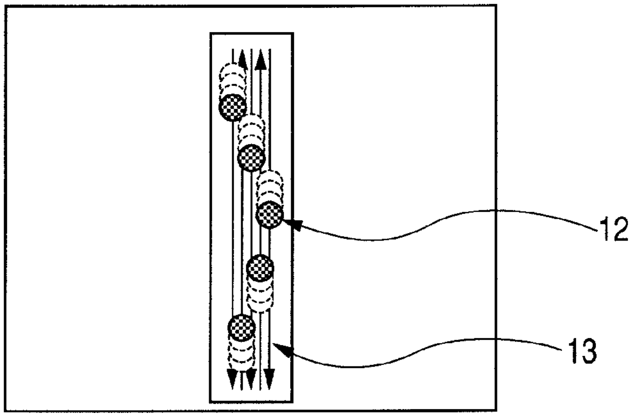
Figure 2:
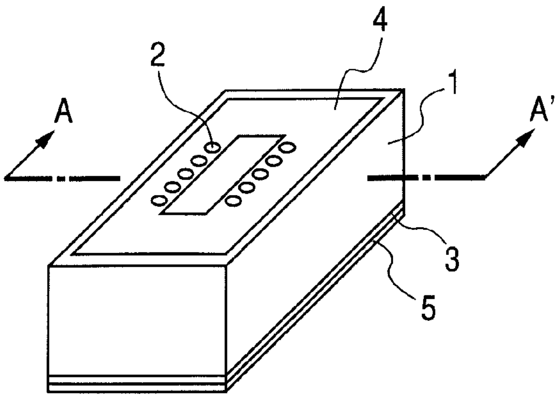
FIG. 2 is a perspective view of the substrate for an ink jet head.
Figure 3A:
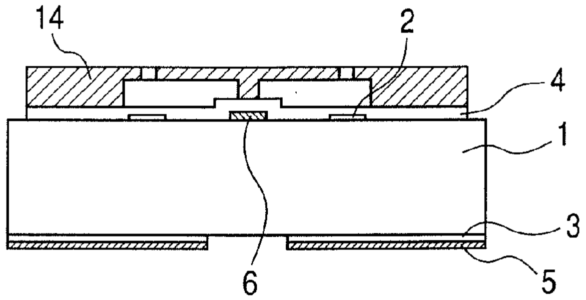
FIGS. 3A and 3B are diagrams for illustrating a method of manufacturing the substrate for an ink jet head.
Figure 3B:
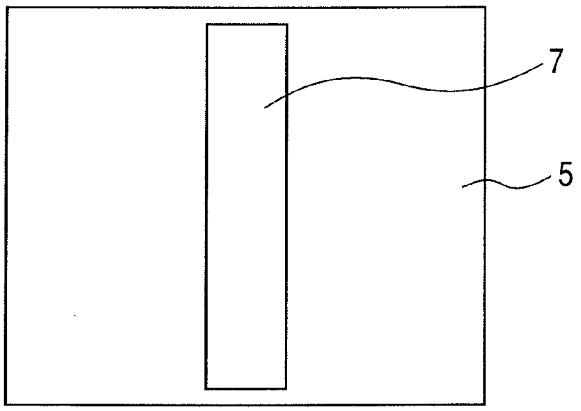

FIG. 1A is a sectional view of an ink jet head using a substrate for an ink jet head according to a first embodiment of the present invention, and FIG. 1B is a bottom view of the ink jet head. FIG. 2 is a perspective view of the substrate for an ink jet head according to the first embodiment, FIG. 3A is a sectional view taken along the line A-A' illustrated in FIG. 2, and FIG. 3B is a bottom view of the substrate illustrated in FIGS. 1A and 1B.

With reference to those figures, the ink jet head is formed by forming a flow path formation layer 14 on a front surface side of the substrate for an ink jet head. The flow path formation layer 14 has an ink flow path 10 enclosing ink discharge energy generating elements 2 and liquid discharge openings disposed so as to be opposed to the ink discharge energy generating elements 2, respectively. Further, an ink supply opening 9 as a through opening which is formed so as to pierce the substrate from a back surface side of the substrate and which communicates with the ink flow path 10 is formed in the substrate for an ink jet head.

The structure and manufacture of the above-mentioned substrate for an ink jet head is now described in detail. Wiring made of Al or the like (not shown) and a plurality of the ink discharge energy generating elements 2 made of a high resistance material such as TaSiN or TaN are formed in two lines on one side of a silicon substrate 1. Then, an insulation protection film 4 made of SiN or the like is formed so as to cover the upper portion of the wiring and the ink discharge energy generating elements 2. The insulation protection film 4 protects the wiring structure on the substrate 1 from ink and liquid, and also functions as an etching stop layer when the ink supply opening is formed.

Further, a sacrificial layer 6 is provided below the insulation protection film 4 and on the silicon substrate 1 on the side in which the silicon substrate 1 is covered with the insulation protection film 4 in a region where the ink supply opening is to be formed. The sacrificial layer 6 has an etching rate which is higher than the etching rate of silicon, and is a layer for defining the width of the ink supply opening in a subsequent anisotropic etching process. Therefore, the material of the sacrificial layer 6 is required to have an etching rate which is higher than the etching rate of silicon. Here, if Al is selected, the sacrificial layer can be formed simultaneously with formation of a wiring lamination structure of the ink jet head, which is efficient.

The flow path formation layer 14 is formed by forming a mold for the ink flow path 10 by photolithography on the insulation protection film 4 and then laminating an organic material thereon. It is to be noted that, after the liquid discharge opening is formed, the mold for the ink flow path 10 is removed through the liquid discharge opening.

An insulation protection film 3 made of SiO and an organic protection film 5 are formed in this order on a surface of the silicon substrate 1 which is opposite to the surface having the sacrificial layer 6 formed thereon, and back surface patterning 7 (mask layer) is formed by photolithography (FIG. 3B).

Figure 4A:
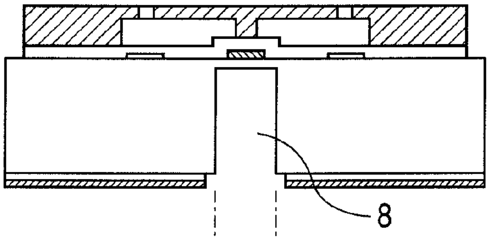
FIGS. 4A and 4B are schematic views illustrating laser ablation according to the first embodiment.
Figure 4B:
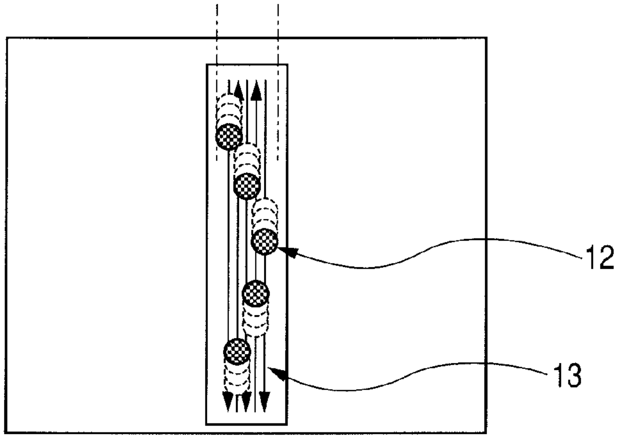

Then, as illustrated in FIGS. 4A and 4B, one processed portion is formed by laser processing on the back surface of the silicon substrate 1 within an opening in the back surface patterning 7. By repeatedly performing laser processing at a position which overlaps a part of the one processed portion and does not overlap the other part of the one processed portion, the portion processed by a laser is expanded to form a recess portion. More specifically, a laser spot 12 having a spot diameter of 50 μm or less is scanned along linear paths 13 of FIG. 4B with a certain amount of displacement from its previous position. Here, the amount of the displacement of the laser spot from its previous position in a scanning direction is 80% or less of the spot diameter. Further, every time the laser scanning comes to an end along the linear paths 13, the laser spot is scanned with a certain amount of displacement from its previous position in a direction substantially perpendicular to the scanning direction. The amount of displacement between the scanning lines in the direction substantially perpendicular to the scanning direction is also 80% or less of the spot diameter such that laser spots along adjacent scanning lines overlap each other. By repeatedly performing such laser processing a plurality of times, a trench 8 having a width larger than the laser spot diameter can be formed as the recess portion. The width of the trench 8 formed here is twice as large as the laser spot diameter or larger. The “amount of displacement” referred to here is defined as the distance from the center of the laser spot at the present position to the center of the moved laser spot at the next position.

It is to be noted that the depth of the processed trench is defined by the kind of the laser, the output conditions of the laser, the laser spot diameter, and the amount of displacement and the number of repetitions of the laser spot. For example, when a third harmonic generation wave of a YAG laser which is excellently absorbed in silicon was used as the kind of the laser and processing was carried out with the output conditions of 4.5 W and 30 kHz, the spot diameter of 25 μm, the amount of displacement of the laser spot in the scanning direction of 40%, the amount of displacement of the laser spot in a column direction of 50%, the number of repetitions of 30, and the width of the trench of 200 μm, the depth of the formed trench was 550 μm. When the thickness of the silicon substrate 1 is 625 μm, in order to form the ink supply opening in the shape of a bullet in a section taken along a depth direction, a trench at a depth of 500 μm or more is desirable. Therefore, the above-mentioned conditions are sufficient to form the ink supply opening in the shape of a bullet. Further, the trench formed under the above-mentioned conditions had a smooth bottom surface and exhibited almost no variation in the depth. It is to be noted that a third harmonic generation wave of a YAG laser was used here, but insofar as the spot diameter is 50 μm or less and the variation in the depth of the processed trench can be made small, a second harmonic generation wave or a fourth harmonic generation wave of a YAG laser, or lasers of other kinds may be used. Further, the scanning of the laser spot is not necessarily linear as illustrated in FIGS. 1B and 4B and may be in a curve, and the selection can be made according to the area to be processed and the depth of the trench to be formed.

Figure 5:
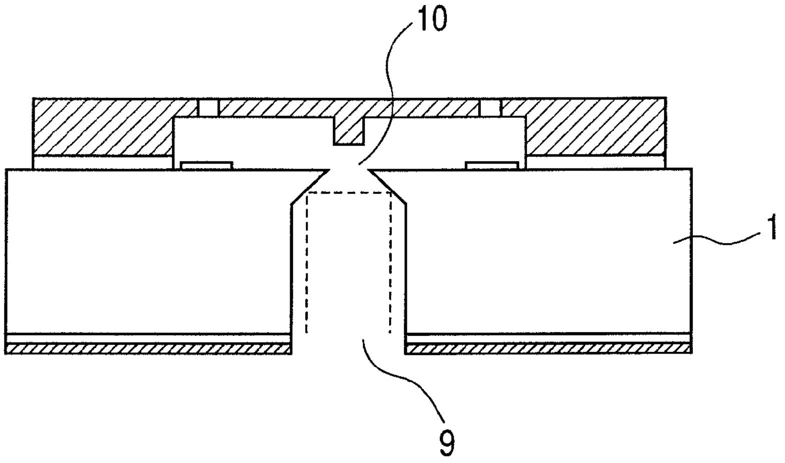
FIG. 5 is a schematic view of an ink supply opening formed according to the first embodiment.

Then, the silicon substrate 1 is soaked in a strong alkaline liquid such as TMAH or KOH to perform anisotropic etching. In this processing, the etching starts with all inner wall surfaces of the trench. A (111) surface having a low etching rate is formed in one area, and the etching progresses along (001) and (011) surfaces having high etching rates in another area. At a tip portion of the trench, as illustrated in FIG. 5, (111) surfaces are formed from corner portions of the trench (illustrated by dotted lines in FIG. 5). When a predetermined time period elapses, the blind portion of the silicon substrate 1 which is the bottom portion of the trench is etched out and a through hole is formed, and then, the sacrificial layer 6 is etched to define the width of the through opening to be the ink supply opening 9. When a trench having a depth of 550 μm was formed in a wafer the thickness of which was 625 μm, time necessary for the anisotropic etching with TMAH was two hours and 45 minutes or less.

Then, by performing dry etching from the back surface side of the silicon substrate 1 (the back surface side of the wafer), the insulation protection film 4 laminated on the sacrificial layer 6 is removed to obtain the ink supply opening 9 as illustrated in FIG. 5. In other words, the through opening to be the ink supply opening 9 communicates with a portion to be the ink flow path 10.

The ink supply opening 9 formed by a manufacturing method including the step of forming the recess portion as the first step and the step of forming the through opening as the second step as described in the above had an opening sized to be 400 μm on the back surface side of the silicon substrate 1. There were not so many defects such as insufficient etching or over etching. Accordingly, the above-mentioned manufacturing method can obtain an ink supply opening with stability which can achieve miniaturization.

Second Embodiment

Figure 6A:
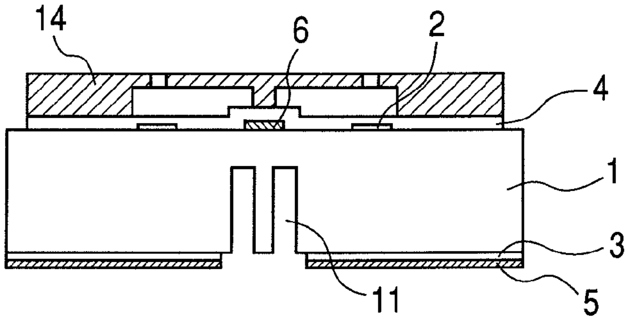
FIGS. 6A and 6B are schematic views illustrating laser ablation according to a second embodiment.
Figure 6B:
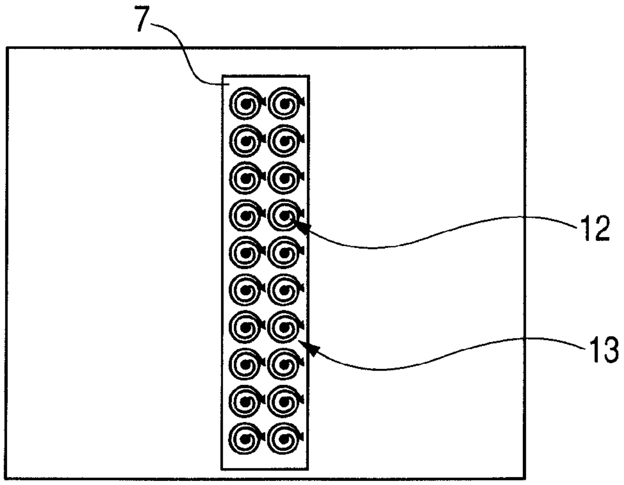
Figure 7:
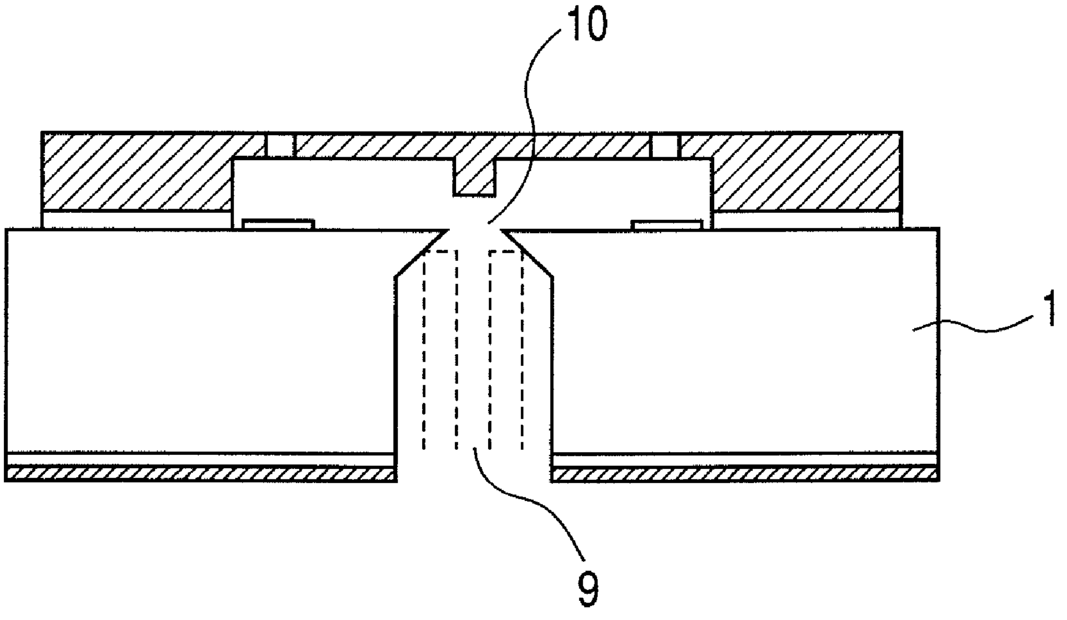
FIG. 7 is a schematic view of an ink supply opening formed according to the second embodiment.

Next, a method of manufacturing a substrate for an ink jet head according to a second embodiment is described. FIGS. 6A, 6B and 7 illustrate a method of laser ablation for achieving the manufacturing method according to the second embodiment. It is to be noted that FIGS. 6A and 7 are sectional views taken along the line A-A' illustrated in FIG. 2 and illustrate states of a processed ink supply opening.

With reference to those figures, wiring (not shown) made of Al or the like and a plurality of ink discharge energy generating elements 2 made of a high resistance material such as TaSiN or TaN are formed in two lines on one side of the silicon substrate 1. Then, an insulation protection film 4 made of SiN or the like is formed so as to cover the upper portion of the wiring and the ink discharge energy generating elements 2. The insulation protection film 4 protects the wiring structure on the substrate 1 from ink and liquid, and also functions as an etching stop layer when the ink supply opening is formed.

Further, a sacrificial layer 6 is provided below the insulation protection film 4 and on the silicon substrate 1 on the side where the silicon substance 1 is covered with the insulation protection film 4 in a region where the ink supply opening is to be formed. The sacrificial layer 6 has an etching rate which is higher than the etching rate of silicon, and is a layer for defining the width of the ink supply opening in a subsequent anisotropic etching process. Therefore, the material of the sacrificial layer 6 is required to have an etching rate which is higher than the etching rate of silicon. Here, if Al is selected, the sacrificial layer can be formed simultaneously with formation of a wiring lamination structure of the ink jet head, which is efficient.

The flow path formation layer 14 is formed by forming a mold for the ink flow path 10 by photolithography on the insulation protection film 4 and then laminating an organic material thereon. It is to be noted that, after the liquid discharge opening is formed, the mold for the ink flow path 10 is removed through the liquid discharge opening.

The insulation protection film 3 made of SiO and an organic protection film 5 are formed in this order on a surface of the silicon substrate 1 which is opposite to the surface having the sacrificial layer 6 formed thereon, and the back surface patterning 7 is formed by photolithography (FIG. 6B).

Then, as illustrated in FIG. 6B, each of laser spots having a spot diameter of 50 μm or less is scanned in a spiral pattern from one point as illustrated by arrows in FIG. 6B on the back surface of the silicon substrate 1 within an opening in the back surface patterning 7. Here, the amount of displacement of a laser spot from its previous position along the spiral scanning direction is 80% or less of the spot diameter. Further, in one spiral, laser spots along adjacent curves overlap each other, and the amount of overlap is 20% or more of the spot diameter. By repeatedly performing such laser processing in a spiral pattern a plurality of times with regard to each place, holes 11 by laser processing having a width larger than the spot diameter can be formed as a deep recess portion. The diameter of the holes 11 by laser processing formed here is twice as large as the laser spot diameter or larger. The "amount of displacement" referred to here is defined as the distance from the center of the laser spot at the present position to the center of the moved laser spot at the next position. Further, the "amount of overlap" referred to here is defined as, when the laser spot moves from the present position to the next position, the amount of overlap between the moved laser spot and the laser spot at the previous position.

It is to be noted that the depth of the processed holes is defined by the kind of the laser, the output conditions of the laser, the laser spot diameter, the diameter of the processed holes, the amount of displacement of the laser spot in the scanning direction, the amount of overlap between laser spots along adjacent curves of one spiral, and the number of turns of the spiral. For example, when a third harmonic generation wave of a YAG laser which is excellently absorbed in silicon was used as the kind of the laser and processing was carried out with the output conditions of 4.5 W and 30 kHz, the spot diameter of 25 μm, the diameter of the processed holes of 100 μm, the amount of displacement of the laser spot in the scanning direction of 20%, the amount of overlap between laser spots along adjacent curves of a spiral of 36%, and the number of turns of the spiral of 6, the depth of the formed holes was 550 μm.

Further, the holes formed under the above-mentioned conditions exhibited almost no variation in the depth. It is to be noted that a third harmonic generation wave of a YAG laser was used here, but insofar as the spot diameter is 50 μm or less and the variation in the depth of the processed holes can be made small, a second harmonic generation wave or a fourth harmonic generation wave of a YAG laser, or lasers of other kinds may be used.

Further, at least two lines of such holes 11 by laser processing are provided on the back surface of the silicon substrate 1 within an opening in the back surface patterning 7. This can reduce the necessary time for the anisotropic etching, and chip shrink can be achieved. For example, a silicon substrate at a thickness of 625 μm is used and two lines of such holes are processed with the above-mentioned depth of 550 μm, the diameter of the processed holes of 100 μm, and the distance between the holes of 150 μm. Those were sufficient to form the ink supply opening in the shape of a bullet in a section taken along a depth direction.

Then, the silicon substrate 1 is soaked in a strong alkaline liquid such as TMAH or KOH to perform anisotropic etching. In this processing, the etching starts with inner wall surfaces of the holes by laser processing. A (111) surface having a low etching rate is formed in one area, and the etching progresses along (001) and (011) surfaces having high etching rates in another area. At tip portions of the holes by laser processing, as illustrated in FIG. 7, (111) surfaces are formed. When a predetermined time period elapses, the blind portions of the silicon substrate 1 which are the bottom portions of the holes by laser processing are etched out and a through hole is formed, and then, the sacrificial layer 6 is etched to define the width of the through opening to be the ink supply opening 9. When holes by laser processing having a depth of 550 μm were formed in a wafer the thickness of which was 625 μm, time necessary for the anisotropic etching with TMAH was two hours and 45 minutes or less.

Then, by performing dry etching from the back surface side of the silicon substrate 1 (the back surface side of the wafer), the insulation protection film 4 laminated on the sacrificial layer 6 is removed to obtain the ink supply opening 9 as illustrated in FIG. 7. In other words, the through opening to be the ink supply opening 9 communicates with a portion to be the ink flow path 10.

The ink supply opening 9 formed by a manufacturing method including the step of forming the blind holes as a first step and the step of forming the through opening as the second step as described in the above had an opening sized to be 500 μm on the back surface side of the silicon substrate 1. There were not so many defects such as insufficient etching or over etching. Accordingly, the above-mentioned manufacturing method can obtain an ink supply opening with stability which can achieve miniaturization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-231336, filed Sep. 6, 2007, which is hereby incorporated by reference herein in its entirety.

What is claimed is:

1. A method of manufacturing a substrate for a liquid discharge head, the substrate including a silicon substrate with a liquid supply opening formed therein, the method comprising:

forming one processed portion by laser processing on the substrate from one surface of the substrate;

expanding the one processed portion to form a recess portion by performing laser processing at a position which overlaps a part of the one processed portion and does not overlap another part of the one processed portion; and etching from the one surface of the substrate with the recess portion formed therein to form the liquid supply opening, wherein a diameter of the recess portion is at least twice as large as a laser spot diameter in one laser processing.

2. A method of manufacturing a substrate for a liquid discharge head according to claim 1, wherein the laser is one of a second harmonic generation wave and a third harmonic generation wave of a YAG laser.

3. A method of manufacturing a substrate for a liquid discharge head according to claim 1, wherein the laser processing is performed on the one surface so that laser spot diameters overlap in adjacent laser processings by 80% or less of the one processed portion.

4. A method of manufacturing a substrate for a liquid discharge head according to claim 1, wherein the recess portion is formed in a spiral pattern.

5. A method of manufacturing a substrate for a liquid discharge head according to claim 1, wherein a plurality of the recess portions each having a spiral pattern are formed so that the plurality of the recess portions are discontinuous with one another and the etching removes silicon between the plurality of the recess portions so that the plurality of the recess portions communicate with one another to form the liquid supply opening.

6. A method of manufacturing a substrate for a liquid discharge head according to claim 1, wherein the etching is wet etching.

7. A method of manufacturing a substrate for a liquid discharge head according to claim 1, wherein the laser is scanned along a plurality of linear paths and laser scanning lines formed along each of the linear paths are partially overlapped with each other between the linear paths when a portion of the substrate to be processed is extended to form a recess portion by laser processing.

* * * * *